United States Patent
Arvind et al.

(10) Patent No.: US 12,247,864 B2
(45) Date of Patent: Mar. 11, 2025

(54) PAYLOAD MONITORING DEVICE FOR A MOTOR VEHICLE

(71) Applicant: VOLVO TRUCK CORPORATION, Gothenburg (SE)

(72) Inventors: M Arvind, Tamilnadu (IN); K S Madhuchandra, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 361 days.

(21) Appl. No.: 17/664,534

(22) Filed: May 23, 2022

(65) Prior Publication Data

US 2022/0404191 A1  Dec. 22, 2022

(30) Foreign Application Priority Data

Jun. 21, 2021 (EP) .................................. 21180609

(51) Int. Cl.
*G01G 19/12* (2006.01)
*G01G 3/13* (2006.01)
*G01G 23/18* (2006.01)
*H04B 1/04* (2006.01)

(52) U.S. Cl.
CPC ............ *G01G 19/12* (2013.01); *G01G 3/13* (2013.01); *G01G 23/18* (2013.01); *H04B 1/04* (2013.01)

(58) Field of Classification Search
CPC .......... G01G 19/12; G01G 3/13; G01G 23/18; G01G 3/14; B60G 9/00; G08C 17/02; H04B 1/04; H04B 2204/11; H04B 2400/60
USPC ....................................................... 177/211
See application file for complete search history.

(56) References Cited

U.S. PATENT DOCUMENTS

| | | | |
|---|---|---|---|
| 4,728,922 A * | 3/1988 | Christen | G01G 19/08 177/136 |
| 5,681,998 A | 10/1997 | Nakazaki et al. | |
| 7,113,127 B1 * | 9/2006 | Banet | B60R 25/102 342/357.31 |
| 7,113,852 B2 * | 9/2006 | Kapadia | G07C 5/085 701/32.8 |
| 7,424,403 B2 * | 9/2008 | Robinson | G01H 1/00 73/66 |
| 7,518,493 B2 * | 4/2009 | Bryzek | B60C 23/0408 340/447 |
| 7,825,782 B2 * | 11/2010 | Hermann | H04B 10/1141 340/447 |

(Continued)

FOREIGN PATENT DOCUMENTS

EP  2228663 A2  9/2010

OTHER PUBLICATIONS

European Search Report dated Dec. 14, 2021 in corresponding European Patent Application No. 21180609.6, 8 pages.

*Primary Examiner* — Jacques M Saint Surin
(74) *Attorney, Agent, or Firm* — Venable LLP; Jeffri A. Kaminski

(57) ABSTRACT

A system for monitoring payload of a vehicle includes at least one wireless transmitter comprising a piezo-resistive pressure sensor, a transceiver and a battery unit, encapsulated in an insulating casing, the at least one wireless transmitter being configured to be attached to an axle beam of the vehicle and to emit a wireless signal in response to a mechanical strain of the axle beam, a wireless receiver configured to receive the wireless signal from the at least one wireless transmitter.

15 Claims, 2 Drawing Sheets

(56) References Cited

U.S. PATENT DOCUMENTS

| | | | | |
|---|---|---|---|---|
| 8,255,117 B2* | 8/2012 | Bujak | ................ | B60G 17/0165 |
| | | | | 701/37 |
| 8,452,486 B2* | 5/2013 | Banet | .................... | B60R 25/102 |
| | | | | 701/32.7 |
| 8,548,669 B2* | 10/2013 | Naylor | .................... | G06Q 10/06 |
| | | | | 701/29.1 |
| 9,578,398 B2* | 2/2017 | Svoen | ...................... | H04Q 9/00 |

\* cited by examiner

PAYLOAD MONITORING DEVICE FOR A MOTOR VEHICLE

TECHNICAL FIELD

The invention relates to a device and a system for monitoring payload in motor vehicles, and more particularly in mining trucks. The invention also concerns a motor vehicle, comprising such monitoring payload device and system.

The invention can be applied in vehicle and heavy-duty vehicles, such as trucks, buses and construction equipment. Although the invention will be described with respect to a payload monitoring device for a mining truck, the invention is not restricted to this particular vehicle, but may also be used in other types of vehicles.

BACKGROUND

A mining vehicle generally comprises a trailer configured to transport a payload. The trailer may be supported by support members. Such support members may comprise suspension members. Typically, the force, exerted by the payload weight, is distributed to the suspension members.

Overloading, under loading or uneven loading of vehicles can deteriorate suspension members, drive train or other parts affected by weight. In order to prevent such a deterioration, it is desirable to know the weight of a payload.

Different payload measurement systems and methods are known.

Typically, for a vehicle with a tipping trailer, payload measurement systems utilize sensors that measure hydraulic pressures present in tilt cylinders used for lifting the trailer up and down. However, one problem with such payload measurement systems is that they fail to take into account the impact that the tilt cylinders have on supporting the payload. The contribution of the tilt cylinders in supporting the payload in the trailer varies based on the tilt position of the trailer. Therefore, the estimate of the payload weight can be inaccurate.

A solution is to measure angular position of the trailer. More precisely, the payload measurement system is configured to estimate weight of a payload in a trailer based on the pressure data, the angular position data and predetermined physical parameters relating to a tilt linkage and lift linkage that are useable to characterize an effect of a portion of the payload that is supported by a tilt cylinder assembly. Such measurement systems can be used on vehicle with tipping trailer only.

Moreover, it is known to utilize sensors that measure air pressures present in suspension cylinders, and a device for measuring vehicle orientation with regard to the ground, such as an inclinometer. The device for measuring vehicle orientation enables to compensate for sloped surfaces on which the vehicle drives. Such measurement systems are costly and can be used on vehicle with air suspension only.

While systems for monitoring payload exist, they are not fully satisfactory. Indeed, they are not suitable for all types of vehicles, and they are costly.

It is therefore desirable to provide an improved payload monitoring system that is simple and adaptable to all types of vehicles, in order to prevent suspension deterioration, and therefore reduce warranty costs.

SUMMARY

An object of the invention is to provide a system for monitoring payload that solve at least the previous problem of the prior art.

By the provision of a payload monitoring system, which comprises a piezo-resistive pressure sensor, the payload can be easily and accurately measured, thanks to an onboard system, which can be used to measure any payload, in any vehicle.

Indeed, the piezo resistive pressure sensor is electrically polarized when subjected to the mechanical strain of the axle beam as a result of a payload. The mechanical strain of the surface is advantageously uniform and proportional to the payload, and therefore the amount of change in electrical resistance is proportional to the payload.

For instance, the system can be used to measure the weight of a load in a trailer of a truck, or the weight of a driver on a seat of a vehicle. Therefore, the system can enable to provide the vehicle with adaptive suspension depending on the weight of the payload.

The system is an electromechanical system.

The system is advantageously autonomous.

According to one embodiment, the at least one wireless transmitter comprises a wired communication channel between the piezo-resistive pressure sensor, the transceiver and the battery unit.

According to one embodiment, the piezo-resistive pressure sensor is configured to emit an electrical signal in response to the mechanical strain of the axle beam, and the transceiver is configured to receive the electrical signal in order to emit the wireless signal.

According to one embodiment, the piezo-resistive pressure sensor comprises silicon material.

According to one embodiment, the battery unit comprises a switch configured to switch on the battery unit when the vehicle is moving.

According to one embodiment, the system comprises an amplifier configured to amplify the wireless signal emitted by the at least one wireless transmitter.

According to one embodiment, the wireless receiver comprises a controller configured to transform the wireless signal into a digital signal.

According to one embodiment, the at least one wireless transmitter comprises at least one fastening tip configured to enable the at least one wireless transmitter to be attached to the axle beam.

According to one embodiment, the at least one wireless transmitter comprises two fastening tips configured to enable the at least one wireless transmitter to be attached to the axle beam.

According to one embodiment, the wireless signal is a WiFi or Bluetooth signal.

According to one embodiment, the system comprises two wireless transmitters.

According to one embodiment, the vehicle comprises an axle beam, the at least one wireless transmitter being attached to the axle beam.

According to one embodiment, the axle beam comprises a housing for the at least one transmitter.

According to one embodiment, the at least one fastening tip is integral with the axle beam.

According to one embodiment, the at least one wireless transmitter is fastened onto the at least one fastening tip by screws.

According to one embodiment, the at least one wireless transmitter is integral with the axle beam.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

In this document, "vehicle" means any of a vehicle used for transporting items and goods, such as a mining truck, and a vehicle for transporting people, such as a car, a van, or a bus or a trailer.

Figure 1:
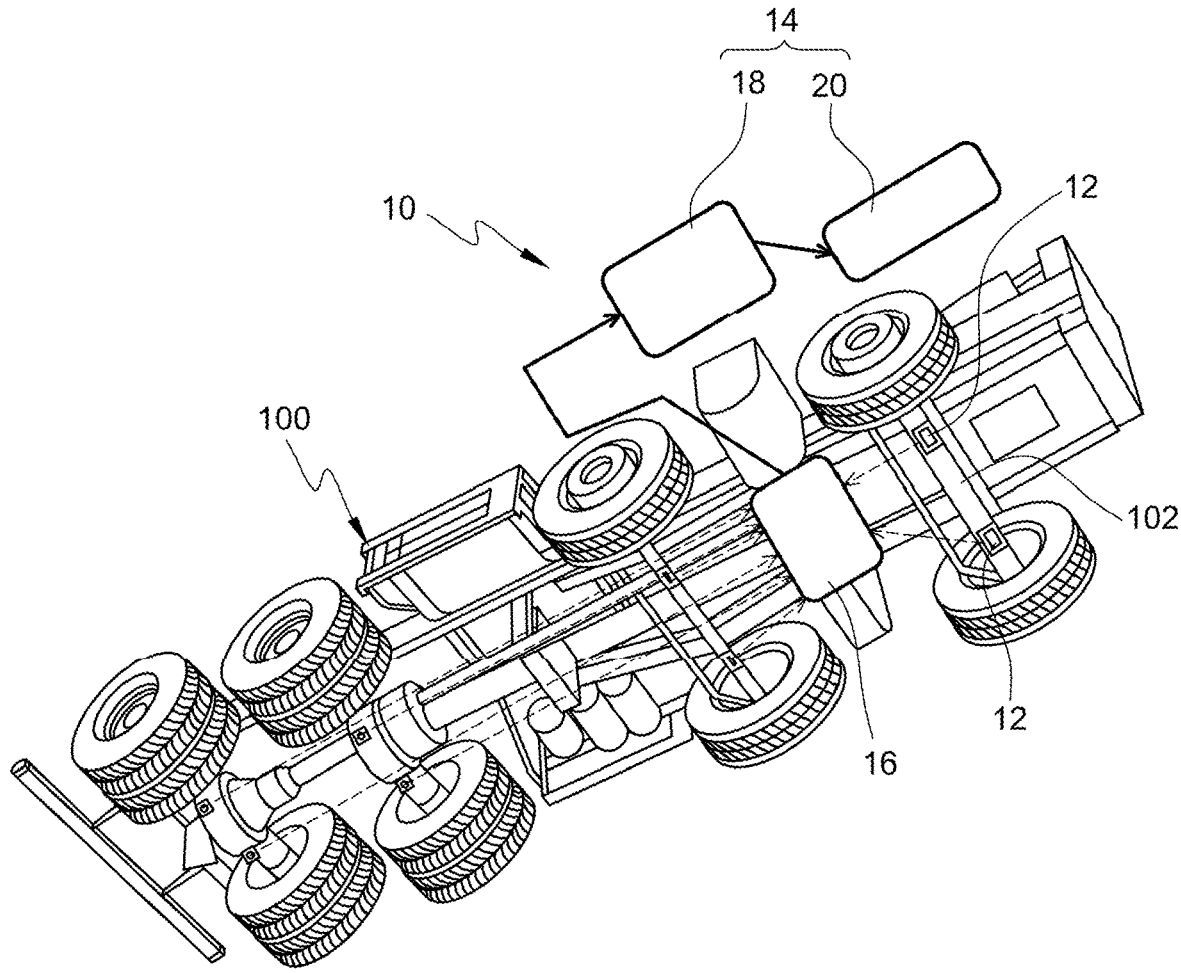
FIG. 1 is a schematic view of a vehicle partially represented, the vehicle comprising a payload monitoring system according to an embodiment of the invention.

FIG. 1 shows a vehicle 100 comprising a system 10 for monitoring payload of the vehicle 100. The system 10 measures the weight of a payload of the vehicle 100.

The system 10 for monitoring payload comprises at least one wireless transmitter 12, and for example can include two wireless transmitters 12. The at least one wireless transmitter 12 is configured to be attached to an axle beam 102 of the vehicle 100 and to emit a wireless signal in response to a mechanical strain of the axle beam 102 which occurs upon a payload put on the vehicle 100.

The system 10 for monitoring payload comprises a wireless receiver 14 configured to receive the wireless signal from the at least one wireless transmitter 12.

The wireless receiver 14 can be configured to be placed inside the vehicle 100. In the example where the vehicle 100 is a truck, such as a mining truck, the wireless receiver 14 can be configured to be placed within the cab roof of the mining truck. Therefore, the system 10 is configured to be an onboard system. Thus the weight of the payload can be read at any time.

The system 10 for monitoring payload can comprise an amplifier 16 configured to amplify the wireless signal emitted by the at least one wireless transmitter 12.

The wireless receiver 14 can comprise a controller 18 configured to transform the wireless signal into a digital signal. The digital signal corresponds to the weight of the payload.

The controller 18 can provide calibration of the mechanical strain according to the payload.

The wireless receiver 14 can comprise a display 20 where the digital signal is displayed.

Figure 2:
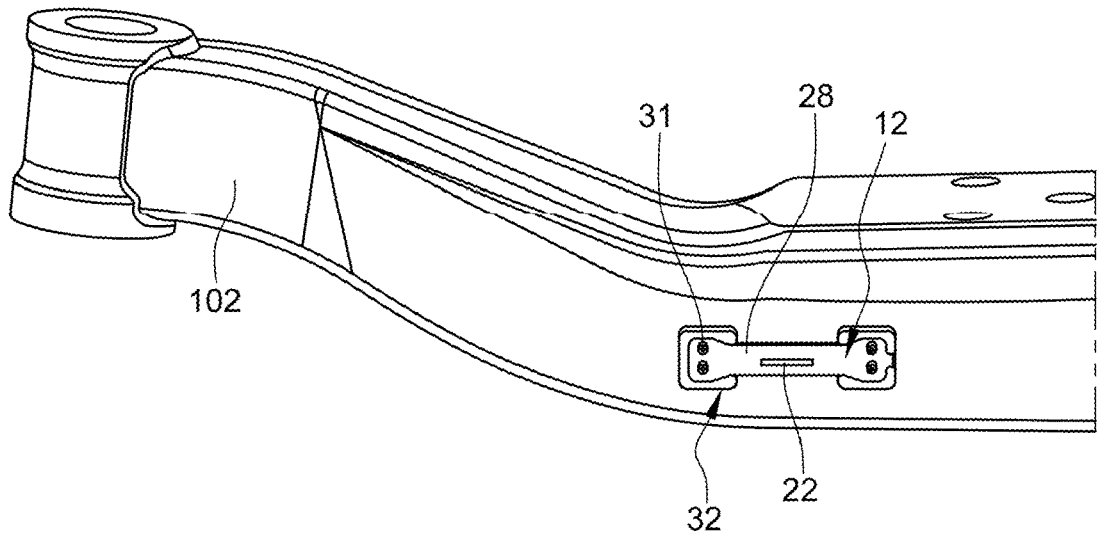
FIG. 2 is a schematic view of an axle beam partially represented, the axle beam comprising a transmitter of a payload monitoring system according to an embodiment of the invention.
Figure 3:
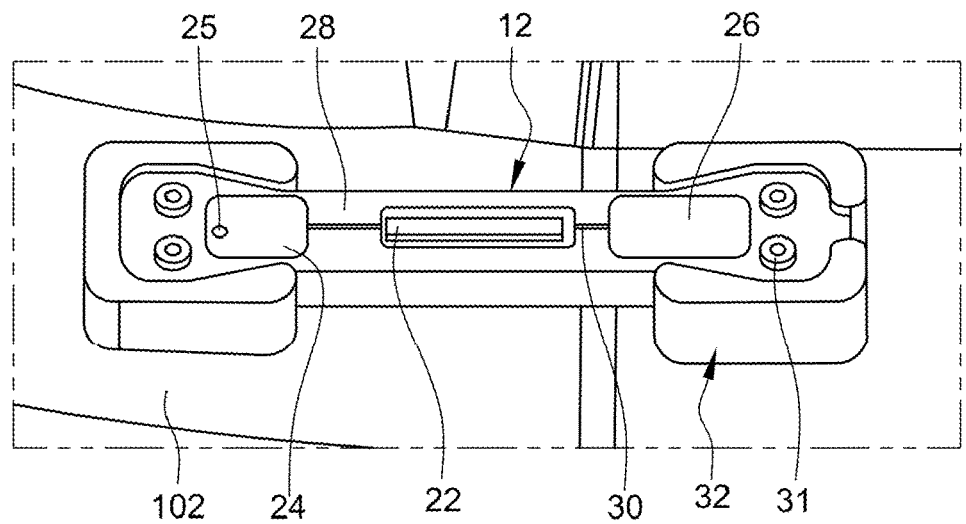
FIG. 3 is a detail view of a transmitter of a payload monitoring system according to an embodiment of the invention.
Figure 4:
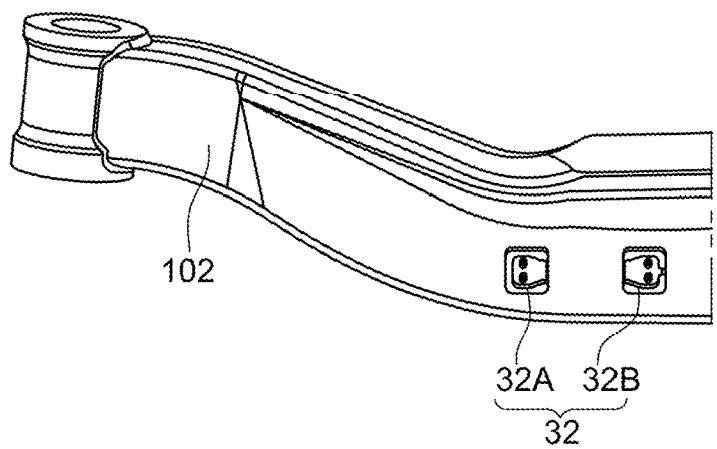
FIG. 4 is a schematic view of an axle beam partially represented, the axle beam comprising a housing for a transmitter of a payload monitoring system according to an embodiment of the invention.
Figure 5:
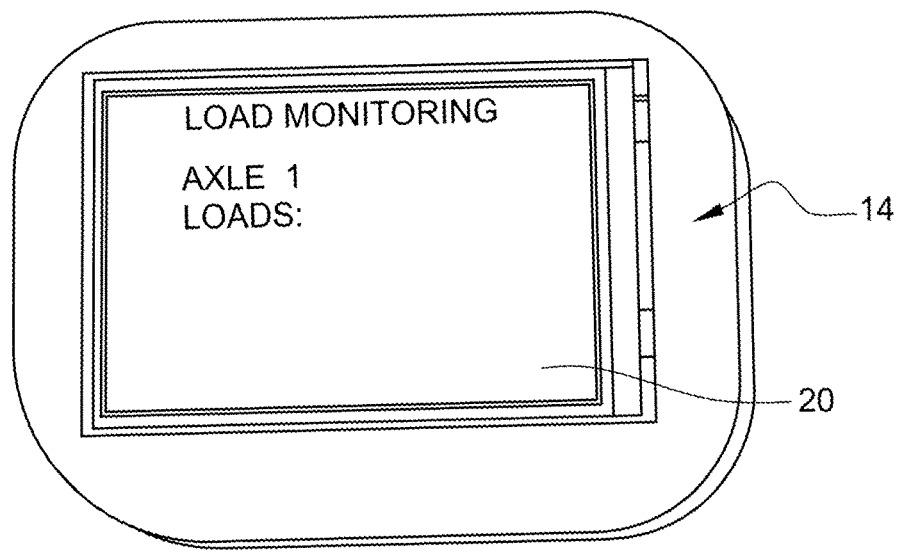
FIG. 5 is a view of a receiver of a payload monitoring system according to an embodiment of the invention.

More precisely, FIGS. 2 and 3 show that the at least one wireless transmitter 12 comprises a piezo-resistive pressure sensor 22, a battery unit 24 and a transceiver 26. The piezo-resistive pressure sensor 22, the battery unit 24 and the transceiver 26 are encapsulated in an insulating casing 28 for protection purposes.

The piezo-resistive pressure sensor 22 is configured to emit an electrical signal in response to a mechanical strain of the axle beam 102 of the vehicle 100.

The piezo resistive pressure sensor 22 is electrically polarized when subjected to the mechanical strain of the axle beam 102 as a result of a payload. The mechanical strain of the axle beam 102 is advantageously uniform and proportional to the payload, and therefore the amount of change in electrical resistance is proportional to the payload.

The at least one wireless transmitter 12 is configured to be attached to the axle beam 102 like a coating. The mechanical strain produced in the axle beam is transferred to the piezo resistive pressure sensor 22 and an electrical output is achieved.

The piezo-resistive pressure sensor 22 can comprise silicon material.

The battery unit 24 can comprise a switch 25 configured to switch on the battery unit 24 when the vehicle 100 is moving.

The at least one wireless transmitter 12 can comprises a wired communication channel 30 between the piezo-resistive pressure sensor 22, the transceiver 26 and the battery unit 24.

The piezo-resistive pressure sensor 22 is configured to emit an electrical signal in response to the mechanical strain of the axle beam 102. The transceiver 26 is configured to receive the electrical signal and to emit the wireless signal.

The at least one wireless transmitter 12 can be configured to be attached to the axle beam 102 by screws 31 or any suitable connecting means.

The at least one wireless transmitter 12 can comprise at least one fastening bracket 32 configured to enable the at least one wireless transmitter 12 to be attached to the axle beam 102. The at least one wireless transmitter 12 can be attached to the at least one fastening bracket 32 by screws 31. The at least one fastening bracket 32 can be configured to be attached to the axle beam 102, for instance by screws.

The at least one wireless transmitter 12 can preferably comprise two fastening brackets 32A, 32B configured to rigidly attach the at least one wireless transmitter 12 to the axle beam 102. The fastening brackets 32A, 32B can be placed at a first and a second end of the at least one wireless transmitter 12.

The at least one fastening bracket 32 can be integral with the axle beam 102. The at least one wireless transmitter 12 can be plugged inside the at least one fastening bracket 32.

The at least one wireless transmitter 12 is a removable transmitter. The at least one wireless transmitter 12 can be removed from the axle beam 102 and refitted to the axle beam 102, for maintenance purpose. The system 10 for monitoring payload provides an opportunity for modularity.

The at least one wireless transmitter 12 can be water proof, dust proof and/or EMI compatible.

The wireless signal can be a WiFi or Bluetooth signal.

The system 10 for monitoring payload is therefore a plug and play system. The system 10 is autonomous and does not require a specific wiring.

The system 10 is configured to alert a customer while overloading the vehicle. The system 10 can also keep record of abusive usage of the vehicle.

It is to be understood that the present invention is not limited to the embodiments described above and illustrated in the drawings; rather, the skilled person will recognize that many changes and modifications may be made within the scope of the appended claims.

The invention claimed is:

1. A system for monitoring payload of a vehicle, wherein it comprises: at least one wireless transmitter comprising a piezo-resistive pressure sensor, a transceiver and a battery unit, encapsulated in an insulating casing, the at least one wireless transmitter being configured to be attached to an axle beam of the vehicle such that a mechanical strain of the axle beam is uniform and proportional to the payload, and the at least one wireless transmitter is further configured to emit a wireless signal in response to a mechanical strain of the axle beam, a wireless receiver configured to receive the wireless signal from the at least one wireless transmitter.

2. The system according to claim 1 wherein the at least one wireless transmitter comprises a wired communication channel between the piezo-resistive pressure sensor, the transceiver and the battery unit.

3. The system according to claim 1 wherein the piezo-resistive pressure sensor is configured to emit an electrical signal in response to the mechanical strain of the axle beam, and the transceiver is configured to receive the electrical signal in order to emit the wireless signal.

4. The system according to claim 1 wherein the battery unit comprises a switch configured to switch on the battery unit when the vehicle is moving.

5. The system according to claim 1 wherein it comprises an amplifier configured to amplify the wireless signal emitted by the at least one wireless transmitter.

6. The system according to claim 1 wherein the wireless receiver comprises a controller configured to transform the wireless signal into a digital signal.

7. The system according to claim 1 wherein the at least one wireless transmitter comprises at least one fastening bracket configured to enable the at least one wireless transmitter to be attached to the axle beam.

8. The system according to claim 7 wherein the at least one wireless transmitter comprises two fastening brackets configured to enable the at least one wireless transmitter to be attached to the axle beam.

9. The system according to claim 1 wherein the wireless signal is a WiFi or Bluetooth signal.

10. The system according to claim 1 wherein it comprises two wireless transmitters.

11. A vehicle comprising a system according to claim 1.

12. The vehicle according to claim 11 wherein it comprises an axle beam, the at least one wireless transmitter being attached to the axle beam.

13. The vehicle according to claim 12, wherein the at least one fastening bracket is integral with the axle beam.

14. The vehicle according to claim 13 wherein the at least one wireless transmitter is fastened onto the at least one fastening bracket by screws.

15. The vehicle according to claim 11 wherein the at least one wireless transmitter is integral with the axle beam.

* * * * *